US006857977B1

United States Patent
Bertelshofer et al.

(10) Patent No.: US 6,857,977 B1
(45) Date of Patent: Feb. 22, 2005

(54) TENSIONER FOR A TRACTION DRIVE

(75) Inventors: Thomas Bertelshofer, Ebermannstadt (DE); Alfred Strasser, Herzogenaurach (DE); Thomas Ebner, Herzogenaurach (DE); Andreas Lang, Forchheim (DE)

(73) Assignee: INA Wälzlager Schaeffler oHG, Herzogenaurach (DE)

( * ) Notice: Subject to any disclaimer, the term of this patent is extended or adjusted under 35 U.S.C. 154(b) by 54 days.

(21) Appl. No.: 10/069,423

(22) PCT Filed: Jul. 26, 2000

(86) PCT No.: PCT/EP00/07142

§ 371 (c)(1),
(2), (4) Date: Feb. 19, 2002

(87) PCT Pub. No.: WO01/13009

PCT Pub. Date: Feb. 22, 2001

(30) Foreign Application Priority Data

Aug. 17, 1999 (DE) ..................... 299 14 381 U

(51) Int. Cl.$^7$ ................................ F16H 7/12
(52) U.S. Cl. ..................... 474/117; 474/109
(58) Field of Search .............. 474/101, 109, 474/111, 113, 114, 115, 117

(56) References Cited

U.S. PATENT DOCUMENTS 5,011,460 A * 4/1991 Ouchi et al. ............... 474/133
5,702,314 A * 12/1997 Schmid ...................... 474/94
5,803,849 A * 9/1998 Ayukawa .................... 474/94
6,102,820 A * 8/2000 Imaharu et al. ............ 474/135
6,422,963 B2 * 7/2002 Kurose ...................... 474/101
6,468,172 B1 * 10/2002 Lang et al. ................. 474/135

FOREIGN PATENT DOCUMENTS

| DE | 32 25 411 A1 | 2/1983 | |
|----|--------------|--------|---|
| DE | 37 28 158 A | 3/1989 | |
| DE | 0 400 772 A | 12/1990 | |
| DE | 40 10 928 A1 | 10/1991 | |
| DE | 44 26 666 A | 2/1996 | |
| JP | 1320367 | * 12/1989 | ............. F16H/7/12 |

* cited by examiner

Primary Examiner—Thomas R. Hannon
Assistant Examiner—Vicky A. Johnson
(74) Attorney, Agent, or Firm—Henry M. Feiereisen

(57) ABSTRACT

The invention relates to a tensioner (1) for a traction drive with a rotationally fixed housing (2) to a side of which a rotatable swivel arm (10), provided with a rotatable tension roller, is associated. A torsion spring (7) is placed between the housing (2) and the swivel arm (10) for loading the swivel arm (10) in the direction of an end position. Support of the tension spring (7) is realized by an insert (17a) placed in a circular ring shaped space (16) radially defined by a housing portion and the torsion spring (7).

36 Claims, 5 Drawing Sheets

TENSIONER FOR A TRACTION DRIVE

FIELD OF THE INVENTION

Tensioners find application in traction drives, in particular belt drives, for driving aggregates of an internal combustion engine. The tensioners, which are used to bias the traction drive, include a rotationally fixed housing mounted preferably to the internal combustion engine and having an end formed with a pot-shaped recess. A bearing receptacle placed centrally in the recess includes a longitudinal bore for insertion of an axle. On one end, the axle is connected in fixed rotative engagement with a swivel arm, which is swingably arranged on the side of the housing and has a free end provided with a rotatable tension roller. The other end of the axle is provided with a friction disk which is supported by the housing through forced engagement in concert with a torsion spring extending between the swivel arm and the housing.

BACKGROUND OF THE INVENTION

DE-32 25 411 C2 discloses such a tensioner. The torsion spring involved here is neither guided nor supported between the spring supports upon the housing and the swivel arm, respectively. Vibrations of the traction drive, generated, for example, by the internal combustion engine, which the traction drive is connected to, cause high-frequency adjusting movements of the swivel arm which can produce disadvantageous resonant vibrations that destroy the torsion spring and result in a breakdown of the tensioner.

DE 44 26 666 A1 discloses a tensioner having a torsion spring which is mounted rotationally fixed between the housing and the swivel arm and has an inner side associated to a tension bush. The tension bush, which is provided with an elongate slot, is biased in radial direction and urged by a force to rest against the inner contour of the torsion spring, when installed. The tension bush is hereby made of a metallic material, in particular steel, and extends over a partial length of the torsion spring. A drawback is the generation of noise as a result of high-frequency adjusting movements of the swivel arm, which are dampened or compensated by the torsion spring. This noise generation is encountered in a transition zone between the area supported by the tension bush and the free area where the spring winding bears against the tension bush or separates therefrom in rapid cycles. The effectiveness of the tension bush is governed by the radial bias. Therefore, installation, compressing of the tension bush require a complex assembly.

OBJECT OF THE INVENTION

The invention is therefore based on the object to provide a tensioner which:
effectively prevents a fracture of the torsion spring;
ensures a reliable support of the torsion spring without affecting the function of the tensioner;
prevents a noise development;
simplifies the assembly and can be manufacture in a cost-efficient manner.

SUMMARY OF THE INVENTION

The afore-stated problem is solved according to the invention by a tensioner for a traction drive, in particular a belt drive, with a rotationally fixed housing having one end formed with a recess for arrangement of a bearing receptacle, for receiving and guiding an axle which is connected to a swivel arm arranged on the side of the housing, wherein a rotatable tension roller is arranged on the free end of the swivel arm and disposed upon the traction drive, and a torsion spring in concentric surrounding relationship to the bearing receptacle between the housing and the swivel arm for loading the swivel arm in the direction of an end position and thereby simultaneously axially spreading apart these components, wherein a friction disk is connected to the swivel arm and is urged in forced engagement with the housing for realizing a dampened adjusting movement, characterized in that at least one elastic insert fills over an axial partial length of the torsion spring a circular ring shaped space which is radially defined by a portion of the housing and the torsion spring.

Accordingly, at least an elastic insert is used for placement in a space bounded radially by a housing portion and by the torsion spring. The insert fills hereby the circular ring shaped space over an axial partial length of the torsion spring. The insert according to the invention effectively supports the torsion spring, so that a resonant vibration introduced into the tensioner does not lead to a breakdown of the torsion spring. Unlike the prior art in which the torsion spring is not supported at all or a relatively thin-walled tension bush bears against the inner contour of the torsion spring, the insert according to the present invention prevents, as a consequence of the filled space, the presence of great oscillation amplitudes that destruct the torsion spring. In accordance with the invention, the insert is so sized or dimensioned that the effectiveness and function of the tensioner remains unaffected. Thus, the reliability of the tensioner is improved as the risk of spring fracture is eliminated. In addition to the effective damping of vibrations, the insert according to the invention results also in a noise attenuation because, even when the tensioner is subjected to a load, no noise is generated in view of a support of the torsion spring, made of steel, by the elastic insert, which is, preferably, made of plastic. The insert, which can be made in a cost-efficient manner, has, moreover, a weight advantage and can be handled manually in a simple way and installed without any need for an additional tool.

Configurations of the invention are the subject matter of the dependent claims 2 to 18, which will now be described.

The configuration of the invention provides for the installation of the insert into the installation space defined radially by the bearing receptacle and the torsion spring. As an alternative, it is also possible to dispose the insert in the installation space which is formed between the torsion spring and the inner housing wall. The effectiveness of the insert is hereby independent on the disposition after installation. Rather, the installation position can be determined in dependence on the given installation space or on the given installation conditions.

As an alternative, the invention also includes the use of dampening elements configured as inserts for support of the torsion spring on the inside or the outside.

The insert according to the present invention is so configured as to ensure in the entire working range of the tensioner a support of the torsion spring. Regardless of the deflection of the swivel arm, which causes a radial movement of the windings of the torsion spring, a radial abutment of the insert upon the torsion spring is continuously ensured, i.e. a radial overlap between the insert and the torsion spring.

In accordance with the invention, there is provided a forced engagement of an insert, which is placed between the torsion spring and the bearing receptacle. The dimensional configuration is hereby so selected that the outer diameter of the bearing receptacle exceeds the inner diameter of the insert. This measure realizes a radial overlap, which by itself is sufficient to effect a permanent positioning of the insert.

According to a further dimensional criterion for realizing a secure installation position of the insert resting on the inner side of the torsion spring, the outer diameter of the insert is greater than an adjusting inner diameter of the torsion spring upon installation. An insert disposed on the outside of the torsion spring has therefore and inner diameter which, when installed, is smaller that the adjusting outer diameter of the torsion spring upon installation.

Advantageously, the insert, which is made of suitable elastic material, is tubular or sleeve-shaped. Such a configuration can be manufactured in a cost-efficient manner, does not require a targeted, i.e. positionally oriented installation, and simplifies the assembly.

The invention further includes an insert which has two walls, which, when viewed in half-section, are substantially in parallel relationship in installed position to form a U-shaped profile. The walls of such an insert configured as hollow profile are radially spread apart relative to one another, when not installed, so that the insert is securely positioned in place when the respective wall is urged in forced engagement upon the torsion spring and a respective wall area of the housing. Suited to the installation conditions at hand, the walls may have different lengths. An insert configured as hollow profile may further be provided with one or more elongate slots in the wall preferably directed to the torsion spring. As an alternative, the invention also includes circumferentially distributed elongate slots arranged alternately in the inner wall and the outer wall, to thereby precisely influence the contact force of the wall.

In tensioners with a housing having a bearing receptacle with an outer cylindrical portion to confine the length and to terminate in a conical transition, the insert configured as hollow body can be arranged with the shorter wall on the side of the bearing receptacle.

The configuration of the insert according to the present invention further includes an axial length which corresponds to a distance between at least three spring windings. In this way, a desired support of the torsion spring can be realized in mid-section thereof, regardless of the installation position of the insert.

A further design of the invention provides for an insert with a calotte-shaped outer contour for support upon the torsion spring via a length-defining portion, an equatorial plane, when installed.

In addition to the described embodiment of inserts, the invention covers also further suitable geometric shapes which can be inserted in the space radially defined by the torsion spring and a housing portion.

The effectiveness of the insert according to the invention is assisted, when the insert is fixed in place on the side of the housing. Hereby, it is especially suitable, to fasten the insert to the housing side by gluing. The arrangement of a ring groove on the inner wall of the housing is further suitable to realize a form-fitting securement of the insert, when the insert embraces the outside of the torsion spring.

In accordance with the invention, a suitable material for the insert is plastic, in particular PU-foam. As an alternative, also plastics such as CR-foam, EPDM cellular rubber are suitable. This material has a sufficient wear resistance against movement of the torsion spring and permits also an effective damping of vibrations of the torsion spring.

BRIEF DESCRIPTION OF THE DRAWINGS

Several exemplified embodiments of the invention will now be described in more detail with reference to four figures. It is shown in.

DETAILED DESCRIPTION OF THE DRAWINGS

Figure 1:
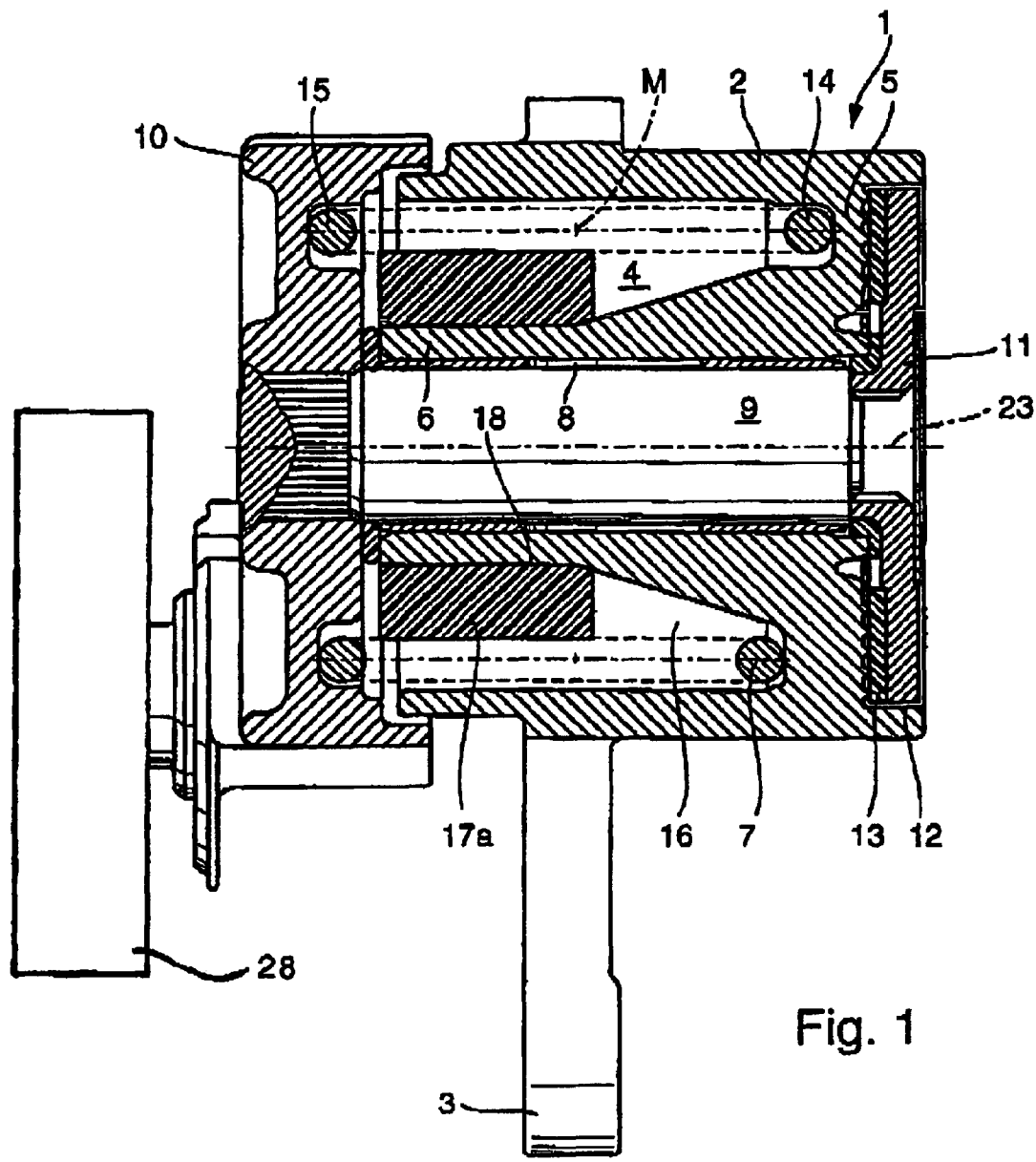
FIG. 1 a longitudinal section through a tensioner according to the invention with a sleeve-like insert, placed between the bearing receptacle and the torsion spring.

FIG. 1 shows a longitudinal section of the configuration of a tensioner 1 according to the invention. The tensioner 1 includes a housing 2 which is secured on the outside via a bracket 3, for example, to an internal combustion engine, not shown in FIG. 1. The housing 2 forms a recess 4 which circumscribes rotationally symmetrically a bearing receptacle 6 and guides, i.a., a torsion spring 7. The bearing receptacle 6 extends from a bottom 5 of the housing 2 over the entire width of the housing 2. The central bore 8 of the bearing receptacle is provided for receiving an axle 9 for rotatably supporting a swivel arm 10 arranged on the side of the housing 2. A rotatable tension roller 28 is arranged on the free end of the swivel arm 10 and disposed upon the traction drive. On the end opposite to the swivel arm 10, the axle 9 is provided with a friction disk 11 which is fitted flush with its end face in a recess 12 of the housing 2 in correspondence with the outer contour of the friction disk 11. At the side of the housing, the friction disk 11 is supported by the housing 2 via a friction lining 13. The torsion spring 7 has spring ends 14, 15, which are positioned in a rotationally fixed manner in the housing 2 and in the swivel arm 10, respectively, and is constructed at the same time as compression spring. This spring configuration generates on the swivel arm 10 a force component which acts in axial direction, with the friction disk 11 being supported simultaneously in force-fitting manner by the housing 2. A space 16 is defined in radial direction by the outer contour of the bearing receptacle 6 as well as the torsion spring 7 and receives an elastic insert 17a which fills the space 6 over a partial length of the torsion spring 7. The size of the insert 17a is such that its outer diameter exceeds the inner diameter of the torsion spring 7, when installed. Such a configuration ensures a permanent contact of the insert 17a against the inner contour of the torsion spring 7 and precludes or compensates thereby a disadvantageous characteristic vibration or resonant vibration of the torsion spring 7. The width of the insert 17a ensures a support of the torsion spring 7 in a mid-section "M". The dampening element configured as insert 17a is secured in place by fixing it via a contact surface 18 upon the outer surface area of the bearing receptacle 6 in a non-detachable manner, preferably through gluing.

Figure 2:
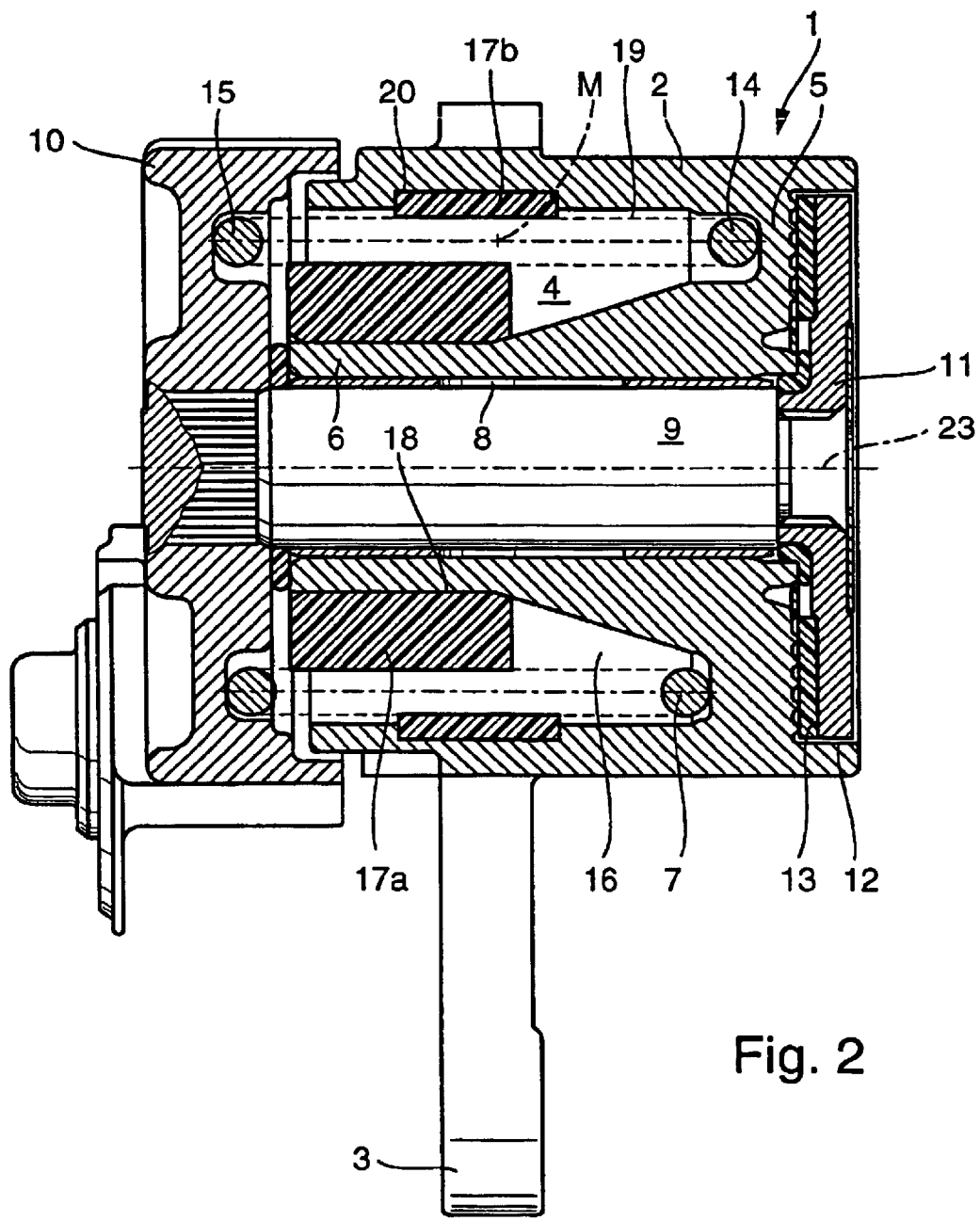
FIG. 2 the tensioner of FIG. 1, provided in addition with a further insert disposed on the outside of the torsion spring.
Figure 3:
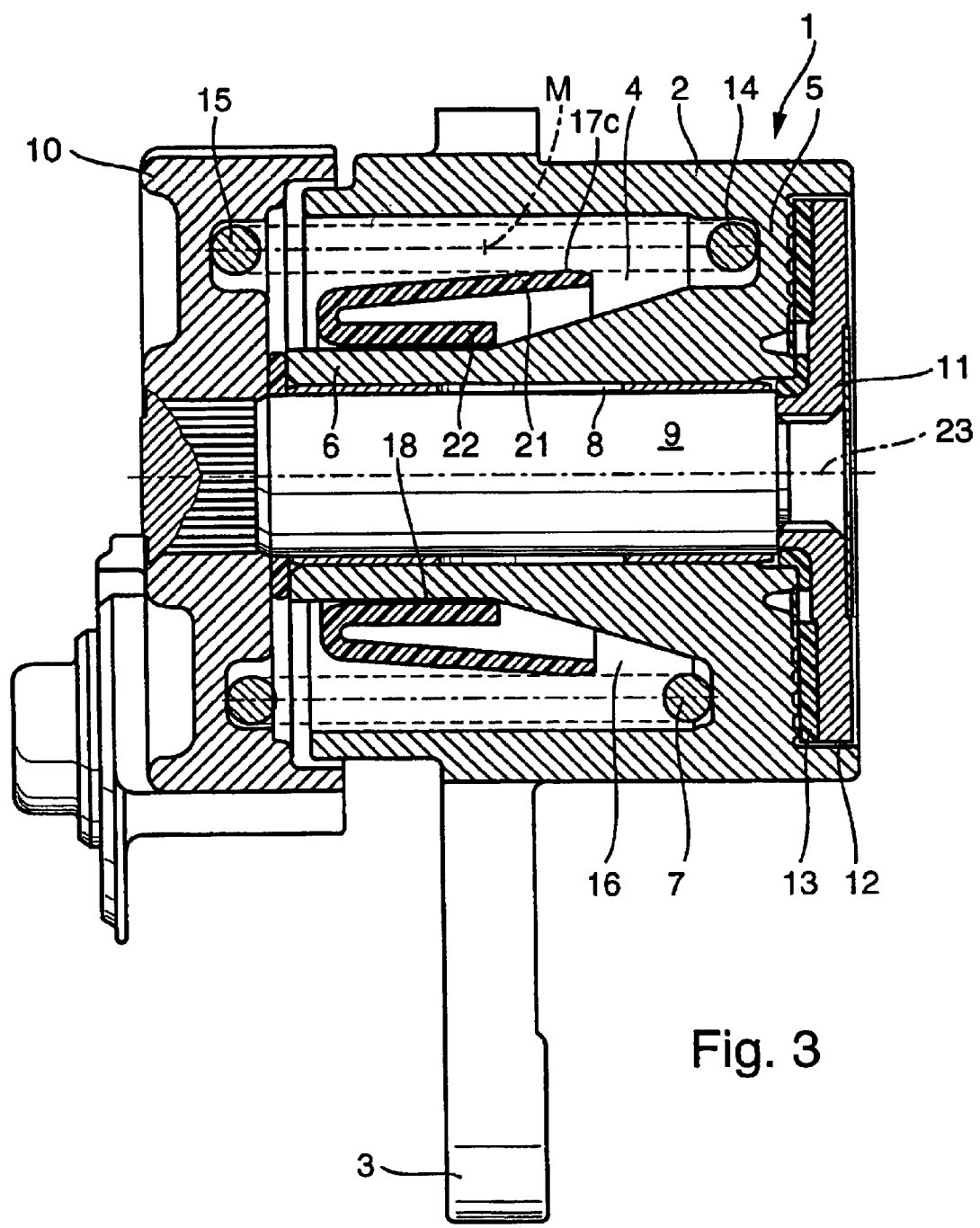
FIG. 3 the tensioner with an insert configured as hollow body.
Figure 4:
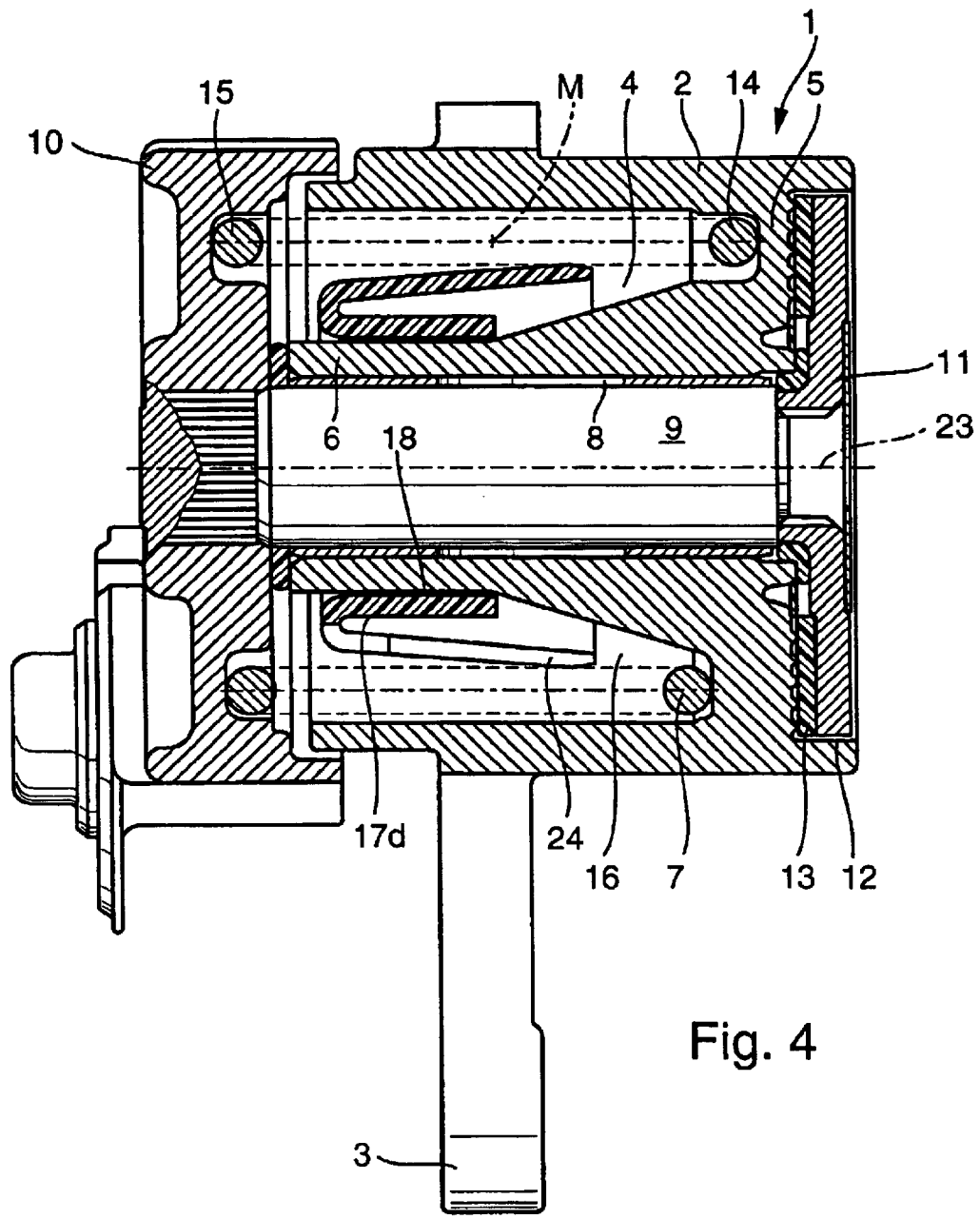
FIG. 4 the insert according to FIG. 3 with an outer wall provided with an elongate slot.
Figure 5:
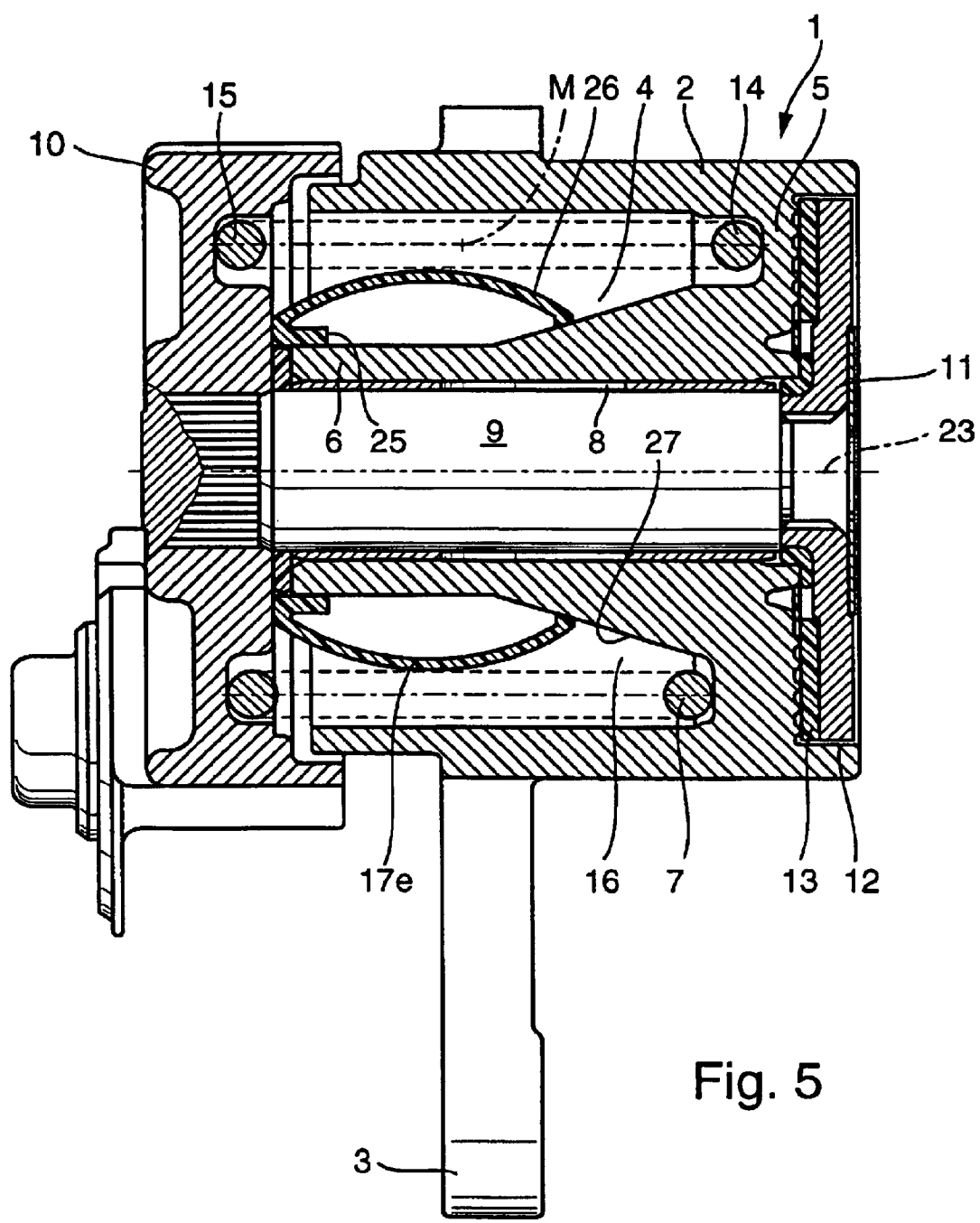
FIG. 5 the tensioner according to FIG. 1, provided with an insert having a calotte-like outer contour.

In the further exemplified embodiments shown in FIGS. 2 to 5 the parts corresponding to the first exemplified embodiment (FIG. 1) are designated by same reference numerals so that repetitions can be avoided by referring to the embodiment of the first exemplified embodiment. The descriptions to FIGS. 2 and 5 are limited therefore to the different parts with respect to FIG. 1.

In FIG. 2, the tensioner 1 is provided in addition to the insert 17a resting upon the inside of the torsion spring 7 with a further insert 17b, which rests on the outside of the torsion spring 7. The insert 17b, which partially fills the space 19 is positively fitted in a ring groove 20 of the housing 2 and thus fixed in place with respect to the torsion spring 7. The size of the insert 17b is so selected that the outer diameter of the torsion spring 7 exceeds the inner diameter of the dampening element 17b in installed state so as to ensure a sufficiently permanent abutment and loading of the insert 17 upon the outer contour of the torsion spring 7.

FIG. 3 shows the insert 17c which, as viewed in half-section, has two walls 21, 22 which form together a substantially U-shaped cross section. The wall 21, which has a greater length and is radially outwardly spread, has one end supported by the inside of the torsion spring 7. The wall 22 extends in concentric relationship to a longitudinal axis 23 of the tensioner 1 and is fixed via the cylindrical contact surface 18 to the bearing receptacle 6 and, preferably, secured in place by gluing.

FIG. 4 shows the insert 17d. In contrast to the insert 17c depicted in FIG. 3, the outer wall 21 of the insert 17d is provided with an elongate slot 24. The dampening element 17d may, for example, be provided with several elongate slots 24 spaced symmetrically about the circumference. The slotted wall 21 allows direct influence of the bias by which the insert 17d is supported upon the inside of the torsion spring 7.

FIG. 5 shows the insert 17e formed with a calotte-shaped outer contour. The insert 17e, which is placed in the space 16 and fills it partially, has an end face, which is directed to the swivel arm 10 and provided with an inwardly directed protrusion 25 for securing the insert 17e in place upon the outer surface area of the bearing receptacle 6. The protrusion 25 terminates in a arched portion 26 whose equatorial plane bear upon the inside of the torsion spring 7. On the side facing away from the protrusion 25, the insert 17e is supported by a cone 27 of the bearing receptacle 6. The insert 17e may be constructed in a cost-efficient manner as a sleeve or a tubular section, with a length which exceeds the available installation space. Assembly results then in an outer calotte-shaped curvature.

1 tensioner
2 housing
3 bracket
4 recess
5 bottom
6 bearing receptacle
7 torsion spring
8 bore
9 axle
10 swivel arm
11 friction disk
12 recess
13 friction lining
14 spring end
15 spring end
16 space
17a insert
17b insert
17c insert
17d insert
17e insert
18 contact surface
19 space
20 ring groove
21 wall
22 wall
23 longitudinal axis
24 elongate slot
25 protrusion
26 section
27 cone

What is claimed is:

1. Tensioner (1) for a traction drive, with a rotationally fixed housing (2) having one end formed with a recess for arrangement of a bearing receptacle (6), for receiving and guiding an axle (9) which is connected to a swivel arm (10) arranged on the side of the housing (2), wherein a rotatable tension roller is arranged on the free end of the swivel arm (10) and disposed upon the traction drive, and a torsion spring (7) in concentric surrounding relationship to the bearing receptacle (6) between the housing (2) and the swivel and (10) for loading the swivel arm (10) in the direction of an end position and thereby simultaneously axially spreading apart these components, wherein a friction disk (11) is connected to the swivel arm (10) and is urged in forced engagement with the housing (2) for realizing a dampened adjusting movement characterized in that at east one elastic insert (17a to 17e) of PU-foam fills over an axial partial length of the torsion spring (7) a circular ring shaped space (16, 19) which is defined by a radially inwardly disposed portion of the bearing receptacle and the surrounding torsion spring (7), wherein the insert has one portion to bear against the radially inwardly disposed portion of the bearing receptacle and another portion to bear against the surrounding torsion spring to thereby bridge the circular ring shared space in radial direction.

2. Tensioner according to claim 1, characterized in that the insert (17b) is placed in the space (19) which is defined by the torsion spring (7) and an inner wall of the bearing receptacle (6).

3. Tensioner according to claim 2, characterized in that the insert (17b) fixed in place in a ring groove (20) of the housing (2) embraces the outside of the torsion spring (7).

4. Tensioner according to claim 1, characterized in that the tensioner (1) includes two inserts (17a, 17b) for placement in the spaces (16 and 19).

5. Tensioner according to claim 1, characterized in that the insert (17a, 17c, 17d) is so placed as to realize a radial overlap between the outer diameter of the bearing receptacle (6) and the inner diameter of the insert (17a, 17c, 17d).

6. Tensioner according to claim 1, characterized in that an outer diameter of the insert (17a, 17b, 17c, 17d) exceeds the inner diameter of the torsion spring (7) in installed state.

7. Tensioner according to claim 1, characterized in that in the installation state, the inner diameter of the insert (17b) is smaller than the outer diameter of the torsion spring (7).

8. Tensioner according to claim 1, characterized by a tubular insert (17a, 17b) placed in the tensioner (1).

9. Tensioner according to claim 1, characterized by a tubular insert (17c, 17d) which when viewed in half-section, has a U-shaped profile with walls substantially in parallel relationship.

10. Tensioner according to claim 9, characterized in that the walls (21, 22) of the insert (17c, 17d) have different lengths.

11. Tensioner according to claim 9, characterized in that the wall (24) of the insert (17d), resting against the torsion spring (7), is provided with at least one elongate slot (24).

12. Tensioner according to claim 9, characterized in that the insert (17c, 17d) circumscribes in an installation position with the shorter wall (22) the outer surface area of the bearing receptacle (6).

13. Tensioner according to claim 9, characterized in that the insert (17c, 17d) is supported in an installation position with the wall (21) by a mid-section "M" of the torsion spring (7).

14. Tensioner according to claim 1, characterized by an insert (17e) which is so positioned upon the bearing receptacle (6) that their calotte-shaped outer contour is supported with an equatorial plane upon the inside of the torsion spring (7).

15. Tensioner according to claim 1, characterized in that the axial length of the insert (17a) at least corresponds to the distance of three windings of the torsions spring (7) in installed state.

16. Tensioner according to claim 1, characterized in that the insert (17a) is non-detachable fixed in place upon the bearing receptacle (6) in the area of a contact surface (18).

17. Tensioner according to claim 1, characterized in that the insert has one portion to bear against the housing and another portion to bear against the torsion spring.

18. A tensioner for a traction drive, comprising:
- a housing having an interior space;
- a swivel arm, mounted on an axle which is guided by an inner housing wall, for supporting a rotatable tension roller interacting with the traction drive;
- a torsion spring disposed in the interior space between the housing and the swivel arm for loading the swivel arm to seek an end position;
- a friction disk connected to the swivel arm and urged in forced engagement with the housing for realizing a dampened adjusting movement; and
- at least one elastic insert made of PU foam and received in the interior space between the torsion spring and a radially inwardly disposed confronting surface of the inner housing wall and extending over an axial partial length of the torsion spring, wherein the insert has one portion to bear against the confronting surface of the inner housing wall and another portion to bear against the torsion spring to thereby bridge the interior space in radial direction.

19. The tensioner of claim 18, wherein the insert is placed between an inside area of the torsion spring and the inner housing wall.

20. The tensioner of claim 19, wherein the insert has a calotte-shaped outer contour and defines an equatorial plane resting against the inside area of the torsion spring.

21. The tensioner of claim 19, and further comprising a second said insert placed in the interior space between an outside of the torsion spring and a confronting surface of an outer housing wall.

22. The tensioner of claim 18, wherein the insert has an inner diameter which is smaller than an outer diameter of the inner housing wall.

23. The tensioner of claim 18, wherein the insert has an outer diameter is greater than an inner diameter of the torsion spring.

24. The tensioner of claim 18, wherein the insert has an inner diameter which is smaller than an outer diameter of the torsion spring.

25. The tensioner of claim 18, wherein the insert has a tubular configuration.

26. The tensioner of claim 25, wherein the insert, when viewed in half-section, has a U-shaped profile with walls substantially in parallel relationship.

27. The tensioner of claim 26, wherein the walls of the insert have different lengths.

28. The tensioner of claim 26, wherein one of the walls of the insert rests against the torsion spring and is provided with at least one elongate slot.

29. The tensioner of claim 26, wherein one of the walls of the insert is shorter and circumscribes an outer surface area of the inner housing wall.

30. The tensioner of claim 26, wherein one of the walls of the insert rests in a mid-section against the torsion spring.

31. The tensioner of claim 18, wherein the insert has an axial length which at last corresponds to a distance of three windings of the torsions spring.

32. The tensioner of claim 21, wherein the second insert is received in an inner ring groove of the outer housing wall.

33. The tensioner of claim 18, wherein the insert is non-detachable fixed to the inner housing wall.

34. The tensioner of claim 18, wherein the insert is glued to the inner housing wall.

35. Tensioner according to claim 16, characterized in that the insert (17a) is glued upon the bearing receptacle (6) in the area of a contact surface (18).

36. The tensioner of claim 18, wherein the insert has one portion to bear against the housing and another portion to bear against the torsion spring.

* * * * *